United States Patent
Lai et al.

Patent Number: 5,490,141
Date of Patent: Feb. 6, 1996

[54] SYSTEM AND METHOD FOR PROVIDING SVC SERVICE THROUGH AN ATM NETWORK FOR FRAME RELAY DTES WITH A TERMINAL ADAPTER

[75] Inventors: Fuyung Lai, Raleigh; Kian-Bon K. Sy, Cary, both of N.C.

[73] Assignee: International Business Machines Corporation, Armonk, N.Y.

[21] Appl. No.: 316,675

[22] Filed: Sep. 30, 1994

[51] Int. Cl.$^6$ .................................................. H04Q 11/04
[52] U.S. Cl. ...................... 370/60.1; 370/79; 370/85.13; 370/94.2
[58] Field of Search ............................... 370/60.1, 79, 60, 370/110.1, 94.1, 85.5, 85.13, 94.2, 58.2, 58.3, 85.14

[56] References Cited

U.S. PATENT DOCUMENTS

| | | | |
|---|---|---|---|
| 5,231,631 | 7/1993 | Buhrhe et al. | 370/60 |
| 5,280,476 | 1/1994 | Xojima et al. | 370/60.1 |
| 5,311,509 | 5/1994 | Heddes et al. | 370/60 |
| 5,343,465 | 8/1994 | Khalil | 370/94.1 |
| 5,363,369 | 11/1994 | Hemmady et al. | 370/60 |
| 5,392,402 | 2/1995 | Robrock, II | 370/60.1 |

FOREIGN PATENT DOCUMENTS

| | | | |
|---|---|---|---|
| 5268255 | 3/1992 | Japan | 370/60.1 |

OTHER PUBLICATIONS

Mimoli, et al., "ATM & Cell Relay Serivce for Corporate Environment", McGraw-Hill Series on Computer Comm., Chapter 7, pp. 1-39, 1993.

*Primary Examiner*—Alpus H. Hsu
*Assistant Examiner*—Ricky Q. Ngo
*Attorney, Agent, or Firm*—Stephen T. Keohane

[57] ABSTRACT

The system and method of the present invention provide a seamless approach for providing ATM connectivity for a Frame Relay DTE using an intelligent Terminal Adapter (TA). Using the system and method of the present invention, an enhanced Frame Relay protocol runs between the DTE and the ATM TA, the Frame Relay DTE is provided with not only the connectivity to the ATM network but also the full advantages of ATM transport mechanism and, in particular, the connectivity through the ATM network using the SVC connection mechanism. Using the system and method of the present invention, a FR DTE may issue commands to the terminal adapter to set of calls, or connections, with other DTEs (FR or ATM). The terminal adapter then communicates with the ATM network and the destination DTE using the ANSI Q.2931 call establishment procedure (using commands such as Call_Set-up, Call_Accept, and Call_Disconnect) to establish an SVC connection between the communicating DTEs. In addition, the FR DTE sends parameters such as quality of service (QOS), peak bandwidth, etc., so that the Frame Relay DTE can send real-time data, image, voice, or video traffics across the ATM network using the less expensive SVC mechanism.

28 Claims, 10 Drawing Sheets

ATM Cell Layout

SYSTEM AND METHOD FOR PROVIDING SVC SERVICE THROUGH AN ATM NETWORK FOR FRAME RELAY DTES WITH A TERMINAL ADAPTER

RELATED APPLICATIONS

This is related to commonly assigned, co-pending application entitled "System And Method For Providing ATM Support For Frame Relay DTEs With A Terminal Adapter" filed concurrently herewith.

BACKGROUND OF THE INVENTION

I. Field of the Invention

The present invention relates to the interworking between Frame Relay and Asynchronous Transfer Mode (ATM) transmission schemes and, more particularly, to a system and method for allowing a FR DTE to communicate with another FR DTE or to an ATM DTE through wide area or local area ATM network, the communication through the ATM network being the Switched Virtual Circuit (SVC) service.

II. Background of the Invention

Over the past decade, many businesses, through growth and mergers, have dispersed their locations across the country and, in many cases, around the world. In the various business locations, local area networks (LANs) are used for interconnecting groups of people using PCs and workstations. As the popularity of LANs increases, so does the need for the interconnection of those LANs located across the country and around the world.

But as the size and geographic dispersement of these private networks grow, the interconnect expense increases. The cost and complexity of building and managing these private networks increase exponentially as more equipment, facilities and expertise is required.

Frame Relay is one of the most convincing transmission schemes in today's networking world. The Frame Relay is a frame based transmission technique and has gained a lot of support from the Data Terminal Equipment (DTE) vendors and the end user groups. Frame Relay, a "fast packet" multiplexing specification, is designed to create more efficient wide area networks (WANs) by permitting users to access only the amount of bandwidth they need for a given application. In addition, Frame Relay has been recognized as being able to improve LAN networking solutions by standardizing LAN interconnection techniques and by reducing the number of required leased lines in a network.

Frame Relay is a "connection-oriented" protocol. It establishes a logical connection for the duration of the call, and it is initially being implemented as a permanent virtual circuit (PVC) service. It is a data transport service that operates at layer 2 of the OSI reference model and uses variable length data packets.

Asynchronous Transfer Mode (ATM) has been chosen as the technology for use in the future and, in particular, for supporting Broadband Integrated Services Digital Network (B-ISDN). It can support many types of services at a variety of speeds which makes its particularly appropriate for use with multimedia services that require multiple data channels operating at different speeds.

Frame Relay has emerged as one of the packet technologies in the United States for fractional T1 and T1 rates while ATM is being defined for future implementation at fiber and SONET rates of initially 155 Mb/s and later on 622Mb/s.

Because of evolutionary considerations, such as interface and protocol standardization and equipment availability, differences in performance characteristics, similarity in technology, and potentially common markets served, these two technologies will have to co-exist for some time. Thus, the interworking between Frame Relay and ATM network has become a very important issue.

The problem is that, because Frame Relay has been available for some time now, there are presently available DTE which is adapted for interfacing a network supporting the Frame Relay service, or supports the Frame Relay Interface (FRI). In contrast, however, ATM is relatively new and is not widely available, if available at all in many locations. As a result, presently, few DTEs are equipped with ATM support. Furthermore, the DTE supporting ATM (ATM DTE) that is available is relatively expensive and is somewhat redundant to the DTE presently installed that supports Frame Relay (Frame Relay DTE).

Furthermore, ATM provides additional transport capability that Frame Relay does not provide, such as for multimedia traffic. It would be desirable to utilize ATM transport capability with Frame Relay traffic. In most implementations, Frame Relay supports only the Permanent Virtual Circuit (PVC) connection mechanism and not Switched Virtual Circuit (SVC) connection mechanism. The ATM service supports both PVC and SVC connection mechanisms. Because PVC is more expensive than SVC (PVC is akin to a leased line while SVC is analogous to the dial-up link), it would be desirable for a FR DTE to have access to this less expensive form of data transfer. In addition, because some communication is real-time, such as interactive communication or multimedia data, the guaranteed arrival times and bandwidths of ATM are desirable and many times necessary. It would be desirable for a FR DTE to be able to communicate over ATM utilizing the less expensive SVC service while having the guaranteed arrival times and peak bandwidth for multimedia data.

Therefore, it is desirable to have a terminal adapter which will interface with the subscriber's Frame Relay DTE (via an FRI) and communications adapter and, on the network side, will interface with an ATM network to communicate with either a Frame Relay DTE or an ATM DTE. It is further desirable to have such a terminal adapter allow the Frame Relay DTE capitalize on the transport capability provided by the ATM to transmit delay/loss sensitive traffic, such as multimedia traffic, through the ATM network without adding any overhead through the use of the SVC connection mechanism.

SUMMARY OF THE INVENTION

The system and method of the present invention provide a seamless approach for providing ATM connectivity for a Frame Relay DTE using an intelligent Terminal Adapter (TA). Using the system and method of the present invention, an enhanced Frame Relay protocol runs between the DTE and the ATM TA, the Frame Relay DTE is provided with not only the connectivity to the ATM network but also the full advantages of ATM transport mechanism and, in particular, the connectivity through the ATM network using the SVC connection mechanism. Using the system and method of the present invention, a FR DTE may issue commands to the terminal adapter to set of calls, or connections, with other DTEs (FR or ATM). The terminal adapter then communicates with the ATM network and the destination DTE using the ANSI Q.2931 call establishment procedure (using commands such as Call_Set-up, Call_Accept, and Call_Disconnect) to establish an SVC connection between the communicating DTEs. In addition, the FR DTE sends parameters such as quality of service (QOS), peak bandwidth, etc., so that the Frame Relay DTE can send real-time data, image, voice, or video traffics across the ATM network using the less expensive SVC mechanism.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIGS. 6, 6A, 6B, 6C and 6D illustrate a Frame Relay frame as it is conveyed from the FR DTE to the terminal adapter and the ATM cells which are the result of a segmentation of the FR Frame and which are conveyed to the ATM network.

DETAILED DESCRIPTION OF THE PREFERRED EMBODIMENT

Figure 1:
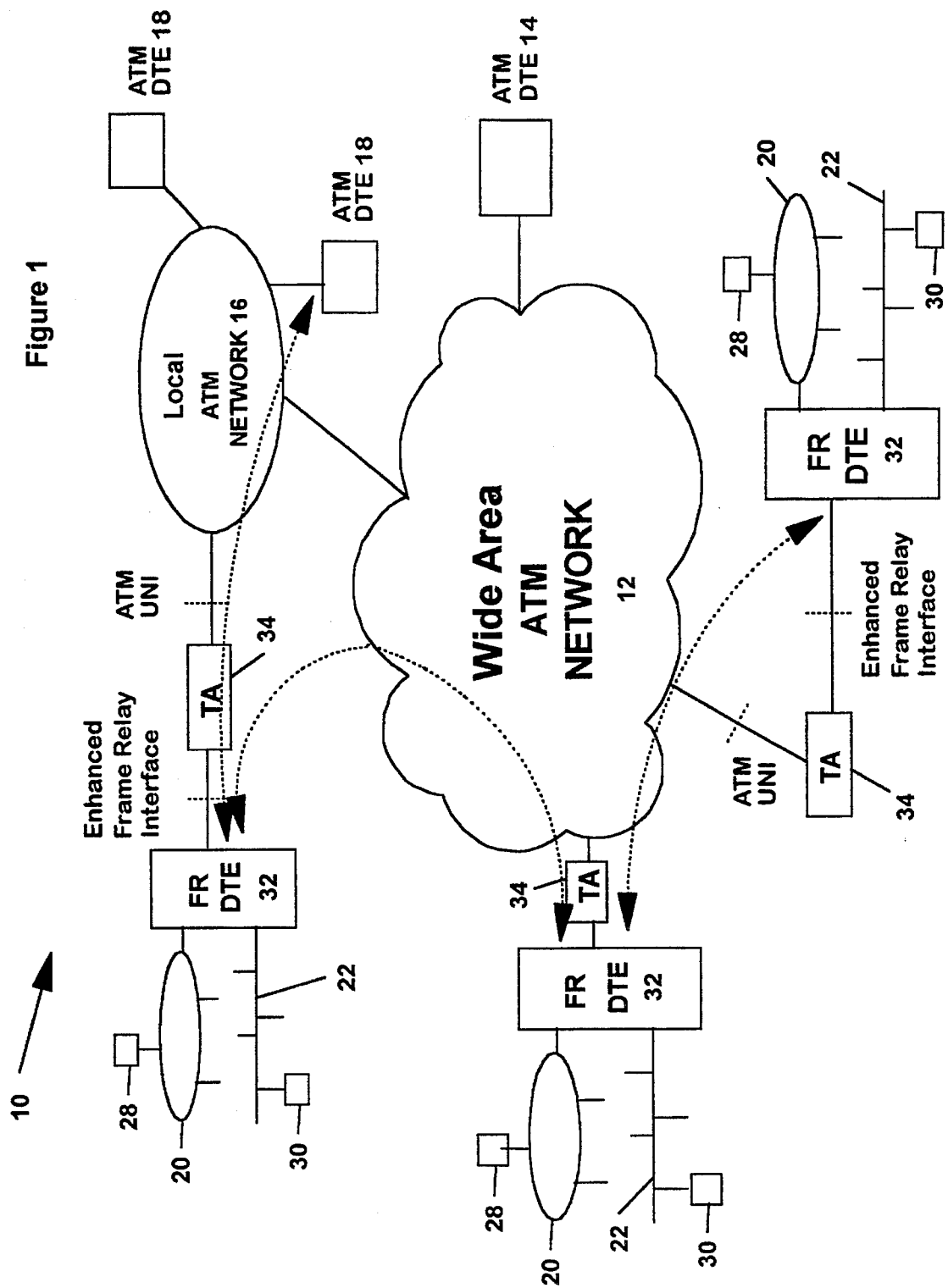
FIG. 1 is a diagram showing the terminal adapter of the present invention as it may be used in a networking environment.

FIG. 1 illustrates a networking environment 10 consisting of a number of individual interconnected networks: a Wide Area ATM Network 12 having an ATM DTE 14 connected thereto; a Local ATM Network 16 having a plurality of ATM DTEs 18 connected thereto: Token Ring Local Area Networks (LANs) 20; and Ethernet LANs 22. The Token Ring LANs 20 and Ethernet LANs 22 have Token Ring and Ethernet workstations 28, 30, respectively, connected thereto. Networking environment 10 further has Frame Relay (FR) DTEs 32 which provide Frame Relay connectivity to the Token Ring and Ethernet LANs 20, 22. The FR DTE is a communications product, such as a communications controller, a router, or a channel extender which is used normally to access the Frame Relay services only, but, with the terminal adapter (TA) 34 of the present invention. ATM services also. The ATM DTEs 14. 18. likewise, are communications products adapted to provide access to the ATM services.

In order to describe the terminal adapter of the present invention, a short technology overview of Frame Relay and ATM is needed.

Frame Relay

Frame Relay is a relatively new packet bearer service for data communications at access speeds of up to 2 Mb/s. The two major characteristics of Frame Relay are:

link layer (layer 2) multiplexing logically out of band call control (signaling)

With regard to link layer multiplexing, unlike X.25. where multiplexing is done at Layer 3 (Packet Layer) and inband signaling is used. Frame Relay operates entirely within the link layer. Based on the multiplexing operation of LAPD, it statistically multiplexes different user data streams at this layer. Each user data stream is called a data link connection (DLC). With the use of link layer multiplexing, differentiation of multiple concurrent data flows on a common physical channel is done at the lowest possible layer in the data transfer protocols. The rationale for pushing the multiplexing function downward in the protocol hierarchy is to take advantage of certain technological advances.

Regarding out of band signal rag, signaling and control information for Frame Relay are separated from the user plane (U-plane)procedures in one of several ways:

on a physically separate interface on a channel (time slot) different from the one used for data, but within the same interface on a separate logical link within the same channel This principle of separation of the control and user planes in the ISDN protocol reference model is used to distinguish interactions needed for the control and signaling functions from those needed to transfer user data.

Figure 2:
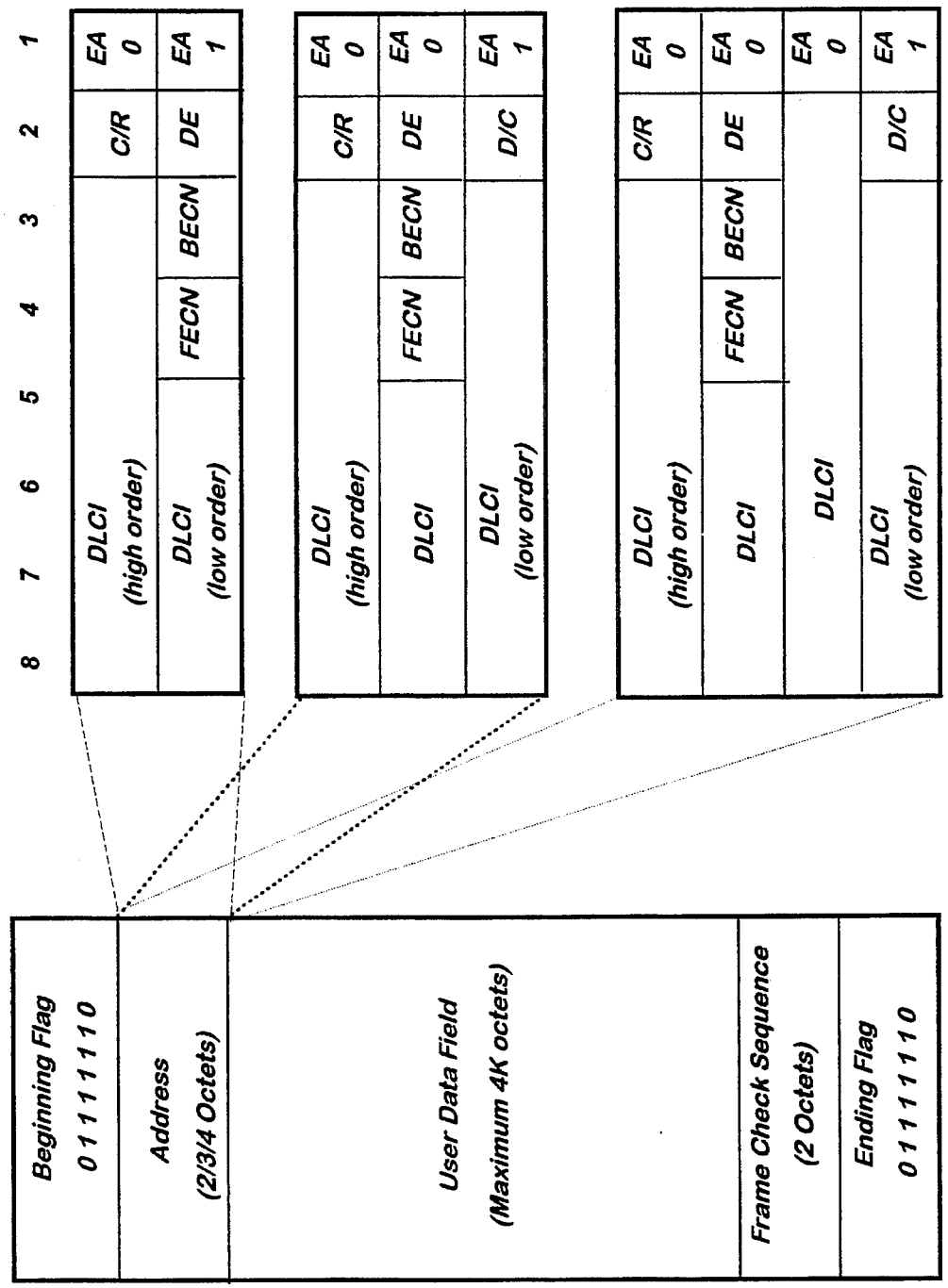
FIG. 2 depicts the frame format of the Frame Relay frame as specified by the ANSI standards.

FIG. 2 illustrates the frame format of the Frame Relay frame as specified by the ANSI standards. (The frame format for data transmission is based upon a subset of Q.921 (LAP-D), but extended with flow control fields. The protocol is known as Link Access Procedure F—Core (LAP-F Core) and is defined in ANSI T1.618-1991; it is also defined in CCITT's Q.922 Annex A.) A Frame Relay frame consists of:

a Flag Sequence—All frames start and end with the flag sequence. The closing flag is preceded by the frame check sequence (FCS);

an Address Field—The Address Field consists of at least two octets but may optionally be extended up to 4 octets through the use of the address field extension bit (EA). The Address Field has the following contents:

a Data Link Connection Identifier (DLCI) field;

a Command/Responce (C/R) indicator;

an Extend Address Field (EA) bit;

a Forward Explicit Congestion Notification (FECN) bit;

a Backward Explicit Congestion Notification (BECN) bit; and a Discard Eligibility (DE) bit;

an Information Field—The Information Field consists of an integral number of octets (no partial octets):

a Frame Check Sequence (FCS) Field—A 16-bit sequence for determining data error; and a Closing Flag Sequence.

ATM

ATM is a transfer mechanism which uses fixed sized packets called cells and statistical (label) multiplexing which allows the cells to be assigned on demand, Cells are identified as belonging to a particular logical connection by the Virtual Channel Identifier (VCI) that is carried as a label in the header of every cell. A virtual path, identified by a Virtual Path Identifier (VPI), is a grouping of virtual channels.

ATM is a connection oriented technique and provides a common lower layer transport mechanism for all services. Connection-oriented services fall into two categories: Permanent Virtual Connections (or Circuits) (PVC) and Switched Virtual Connections (or Circuits) (SVC). In a PVC environment, network connections are established via the service-ordering process, and remain in place until another service order is sent to the carrier—analogous to a dedicated line. In an SVC environment, network connections are established dynamically as needed, through signaling process incorporated in the user equipment and supported by the network—analogous to a dial-up link.

ATM supports a number of applications utilizing what are called ATM Adaptation Layers (AALs). The ATM Adaptation Layer (AAL) is a layer between the ATM layer and the next higher layer in each of the user, control and management planes. The AAL performs functions required by the user, control and management planes and supports the mapping between the ATM layer and the next higher layer. The functions performed in the AAL depend upon the higher layer requirements. The primary function of the AAL is to segment the continuous or bursty information stream into ATM cells at the transmitting terminal and to reconstruct the source stream at the receiving terminal. This layer can provide buffering, end-to-end error and flow control and multiplexing as needed.

Three AALs are currently defined:

1. AAL 1: Timing required, bit rate constant, connection oriented This provides a connection-oriented circuit-emulation or a T1 or a T3 point-to-point line.

2. AAL ¾: Timing not required, bit rate variable, connectionless. This supports a fast packet service such as Switched Multimegabit Data Service (SMDS).

3. AAL 5: Unrestricted (bit rate variable, connection oriented or connectionless), also known as "Class X". Supports fast packet services such as cell-relay service.

Figure 3:
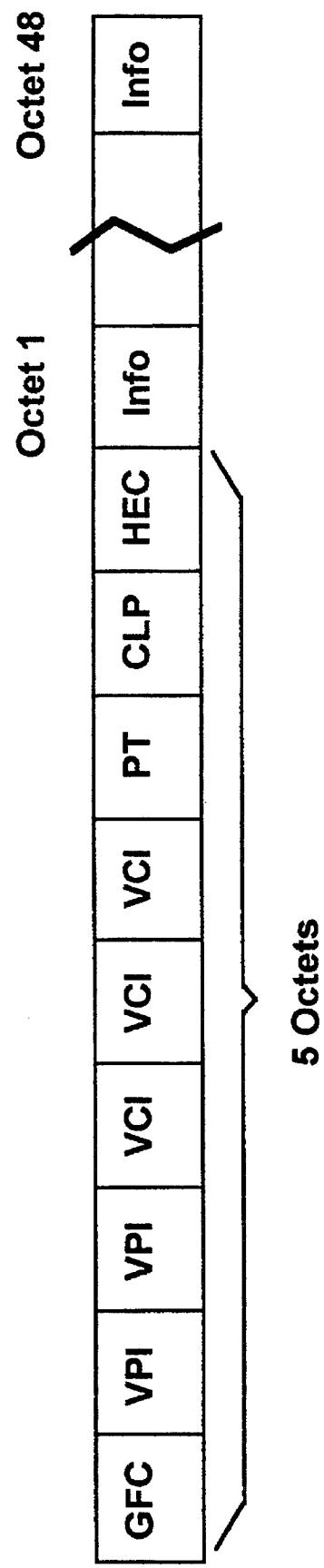
FIG. 3 illustrates an ATM cell layout for the user-network interface (UNI), specified in CCITT Recommendation I.361.

FIG. 3 illustrates an ATM cell layout for the user-network interface (UNI), specified in CCITT Recommendation I.361. The ATM cell comprises the following fields:

a Generic Flow Control (GFC) Field which allows encoding of 16 states of flow control;

a Routing Field comprising a virtual path identifier (VPI) and a virtual channel identifier (VCI);

a Payload Type (PT) Field;

a Cell Loss Priority (CLP) Field; and a Header Error Control (HEC) Field.

Terminal Adapter

Figure 4:
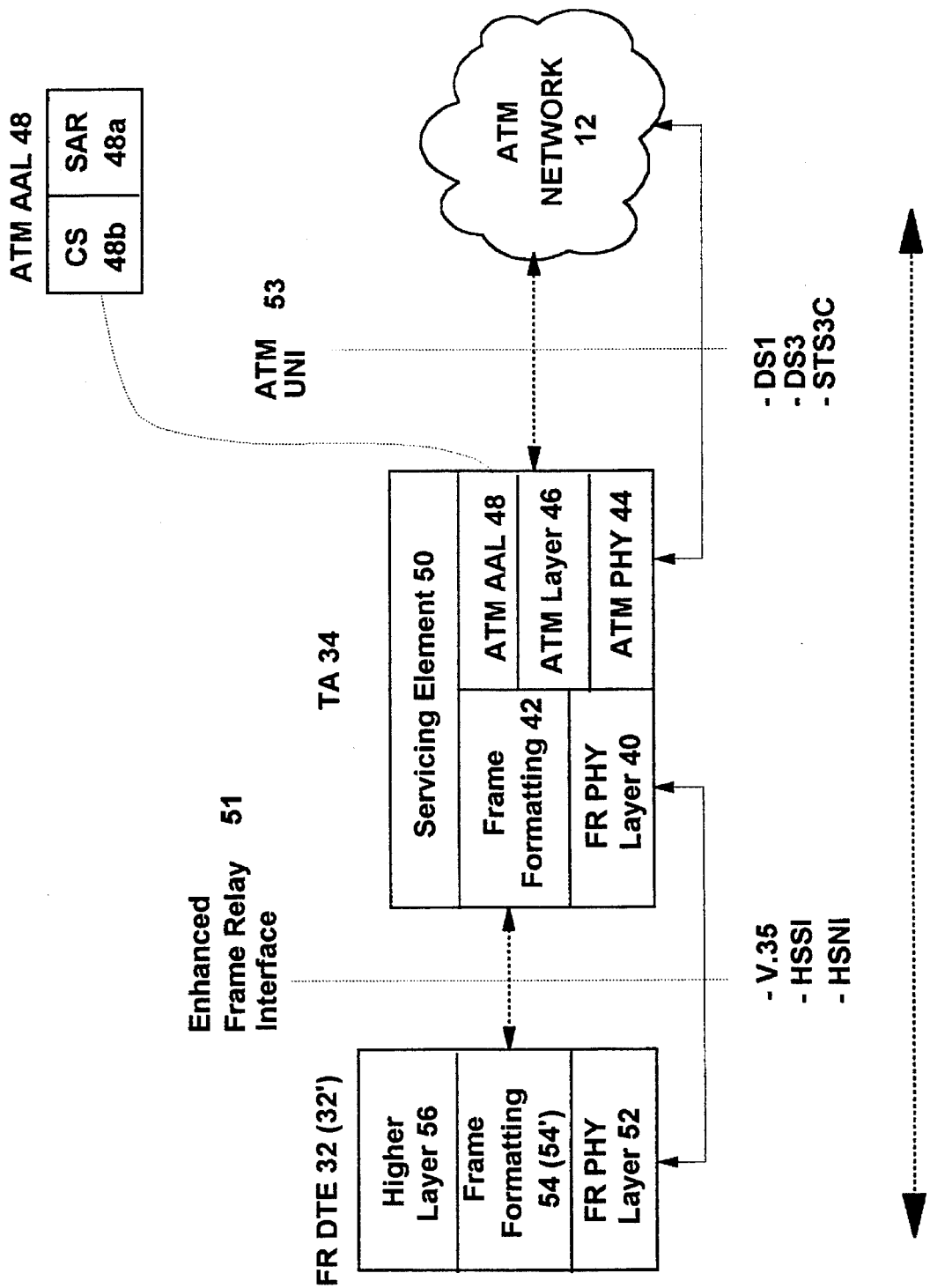
FIG. 4 illustrates the terminal adapter (TA) 34 of the present invention in block diagram form.

FIG. 4 illustrates the terminal adapter (TA) 34 of the present invention in block diagram form. it is connected, on one side, to a FR DTE 32. The FR DTE 32 may have, as shown in FIG. 1, a token ring network and/or an Ethernet network connected thereto but such connections are not shown for simplicity.

The terminal adapter 34 has a number of elements: a Frame Relay physical layer element (FR PHY Layer 40), a frame formatting element 42, an ATM physical layer element (ATM PHY 44), an ATM Layer element 46, ATM AAL Layer 48, and a Servicing element 50. Each of these elements performs a unique function for the terminal adapter 34 and together they provide, on the Frame Relay side, an enhanced Frame Relay User-Network Interface (UNI) 51 and, on the ATM side, an ATM UNI 53.

In particular, the FR physical layer element 40 provides the physical interface to the Frame Relay network and, thus, must conform to the Frame Relay protocols, i.e., RS422, X.21, V.35 (fast RVX), High Speed Serial Interface (HSSI), or High Speed Network Interface (HSNI). The frame formatting element 42 performs the frame formatting for data transfer which is based on a subset of CCITT Q.921 (LAP-D), but extended with flow control fields. This protocol is now known as Link Access Procedure F—Core (LAP-F Core) and is defined by ANSI T1.618. In addition, the frame formatting element 42 supports an enhanced form of the T1.618 (T1.618') so that FR DIEs, also supporting T1.618', may take advantage of the additional transport characteristics of the ATM network. (For the purposes of this specification, the enhanced frame relay interface, which is an enhanced form of the T1.618 standard, is also indicated by T1.618'. Likewise, for remainder of this specification, a prime (') following a numeral indicates an element supporting T1.618'.) Together, these elements provide the enhanced FR UNI 51. This will be discussed below.

On the ATM side, the terminal adapter 34 further has an ATM physical layer element (ATM PHY 44) which connects the terminal adapter to the ATM network. The ATM physical layer element 44 performs a number of physical medium dependent functions such as providing bit transmission capability including bit transfer, bit alignment, line coding, and electrical-optical transformation. In addition, the ATM physical layer element 44 performs other functions such as cell delineation, cell rate decoupling, transmission frame generation and recovery and transmission frame adaptation. There am a number of different public and private interfaces presently specified—a 44.736 Mbps, a 100 Mbs, a 51 Mbps, and two 155.52 Mbps interfaces are specified and a different rate is being considered for UTP cable. The physical transmission system for both public and private user-network interface is based on the Synchronous Optical Network (SONET) standards. Through a framing structure. SONET provides the payload envelope necessary for the transport of ATM cells. The channel operates at 155.52 Mbps and conforms to the Synchronous Transport Signal Level 3 Concatenated (STS-3c) frame. The interface physical characteristics must comply with the SONET Physical Media Dependent (PMD) Sublayer criteria specified in ECSA T1E1.2/92-020. Other interfaces (for DS3, 100 Mbps Multimode Fiber, 155 Mbps Multimode Fiber using 8B/10B and UTP) are also defined. ATM physical layer element 44 need only comply with the specific interface which it is connected to.

Above the ATM physical layer element 44 is the ATM layer element 46. The ATM layer element 46 provides for the transparent transfer of fixed-size ATM layer service data units (ATM-SDUs) to and from the ATM AAL layer element 48. This transfer occurs on a pre-established ATM connection with negotiated parameters such as cell-loss ratio, cell delay, cell delay variations, throughput, and traffic parameters.

Above the ATM layer clement 46 is the ATM AAL element 48. The AAL element is divided into a Segmentation and Reassembly sublayer element 48a and a Convergence sublayer element 48b, the Convergence sublayer providing service to applications. AAL clement 48 supports the three AAL types defined above—AAL Type 1, AAL Type ¾, and AAL Type 5.

Together these ATM elements provide the terminal adapter 34 with the ATM UNI 53.

On top of both the AAL element 48 and the Frame Formatting element 42 is the Servicing element 50. The Servicing element 50 performs a number of services for the terminal adapter. First, when FR frames are being conveyed to a destination DTE using the PVC mechanism, it is utilized to map the address (DLCI) of the data received from the Frame Relay side through the Frame Formatting element 42 to an address (VCI/VPI) of the data to be transmitted through the ATM side through the ATM physical layer element, and vice versa. In addition, for utilizing the SVC communication mechanism, the Servicing element 50 performs call establishment, connection management and call disconnect functions as required in utilizing the SVC connection mechanism for the FR DTE to be discussed.

The FR DTE 32 also has a number of elements—some of which correspond to the terminal adapter elements. At the bottom. FR DTE 32 has a physical layer element (FR PHY Layer 52) which provides the physical interface to the Frame Relay network (corresponding to FR PHY Layer 40 of the terminal adapter). Above the physical layer element 52 is the frame formatting element 54 which performs the frame formatting for data transfer. The frame formatting element 54 may or may not be enhanced, that is, may conform to either T1.618 or 11.618'. (The enhanced version of the element is indicated by reference numeral 54'.) The enhanced frame formatting element 54' allows the FR DTE to communicate with an ATM DTE, or with another FR DTE but also utilizing the advantages provided by the ATM network 12. But, in any case, both FR DTE 32 and 32' can utilize the terminal adapter of the present invention. Above the frame formatting element 54 (54') is the Higher Layer element 56 which performs higher layer functions of the DTE. This will be discussed in greater detail.

In operation, where the FR D7E 32 (32') wishes to communicate with another communications unit via the ATM network using the terminal adapter 34 of the present invention. it must have some a priori knowledge. For instance, it must know the address of the destination communications unit. (This obviously is the case in any communications scheme.) Where the destination communications unit is another FR DTE, the source FR DTE 32 (32') must know the DLCI of the destination FR DTE so that the frame may be properly routed. Likewise, where the destination communications unit is an ATM DTE, the source FR DTE 32 (32') must know the VPI/VCI of the destination ATM DTE which is stored in the DLCI fields of the frame depicted in FIG. 2. But, because the FR DTE must have the enhanced version of the frame formatting element (54') to communicate with an ATM DTE, only FR DTE 32' can do so.

Furthermore, in order for the FR DTE to take advantage of the various services available via an ATM SVC connection, the FR DTE must know which type of service is required by the data to be transmitted. For example, the FR DTE 32' may specify the Quality of Service (QOS) and the peak bandwidth allocation.

Finally, if the FR DTE 32' wishes to exploit the use of the ATM Adaptation Layers (AAL 1, ¾, 5), it must specify to the terminal adapter which AAL to use.

As was discussed above, frame relay presently supports only PVC connectivity. Because PVC is analogous to a leased, or dedicated, line, while SVC is akin to a dial-up link, there are times when a FR DTE user may wish to utilize the more economical SVC service. The terminal adapter of the present invention allows a FR DTE to utilize either PVC or SVC.

There are three phases to the utilization of SVC in the ATM network:

Call set-up

Data transfer

Call disconnect

In order for a FR DTE to take advantage of the SVC provided by an ATM service provider, all three phases are required. The first phase deals with the establishment of the call based on ANSI Q.2931. However, the FR DTE has no mechanism for performing any of these three tasks. Utilizing the present invention, a FR DTE can perform these tasks. This is accomplished through the provision of new commands known to both the FR DTE and the terminal adapter:

SVC Call Set-up

SVC Call Disconnect

SVC Call Accept

SVC Call Reject

SVC Data

These new commands are sent from the FR DTE 32' to the terminal adapter 34. When the terminal adapter receives an SVC Call Set-up command, it recognizes it and establishes the call using the Q.2931 call set-up process. Once the call is established, data transfer phase starts. During this phase, the FR DTE sends SVC data frames to the terminal adapter which the terminal adapter recognizes as SVC data frames and forwards them, after segmentation, to the destination DTE. Once the data transfer is completed, and the FR DTE 32' decides to terminate the operation, it will issue the Call Disconnect command to the terminal adapter 34. The terminal adapter 34 will recognize this command and will initiate the call disconnect process in accordance with Q.2931.

Similarly, at the other end, when a FR DTE is requested to accept a call, it issues to the connected terminal adapter either the (;all Accept or Call Reject command—depending upon its status. The terminal adapter responds to the requesting FR DTE (via its terminal adapter) using the Q.2931 Call Connect or Call Reject protocol.

The commands are unique to the FR DTE and the terminal adapter. The terminal adapter distinguishes these commands from normal FR-to-ATM traffic by the unique DLCI which the FR DTE attaches. Once the terminal adapter recognizes the unique DLCI, it examines the payload and executes the commands inside the payload. Included in the payload with the associated command are the relevant parameters necessary for proper connection establishment. e.g., the E.164 address (telephone number) of the source DTE, the E.164 address of the destination DTE, the desired quality of service, the chosen AAL, and required peak rate. The terminal adapter utilizes these parameters to establish the connection.

Figure 5:
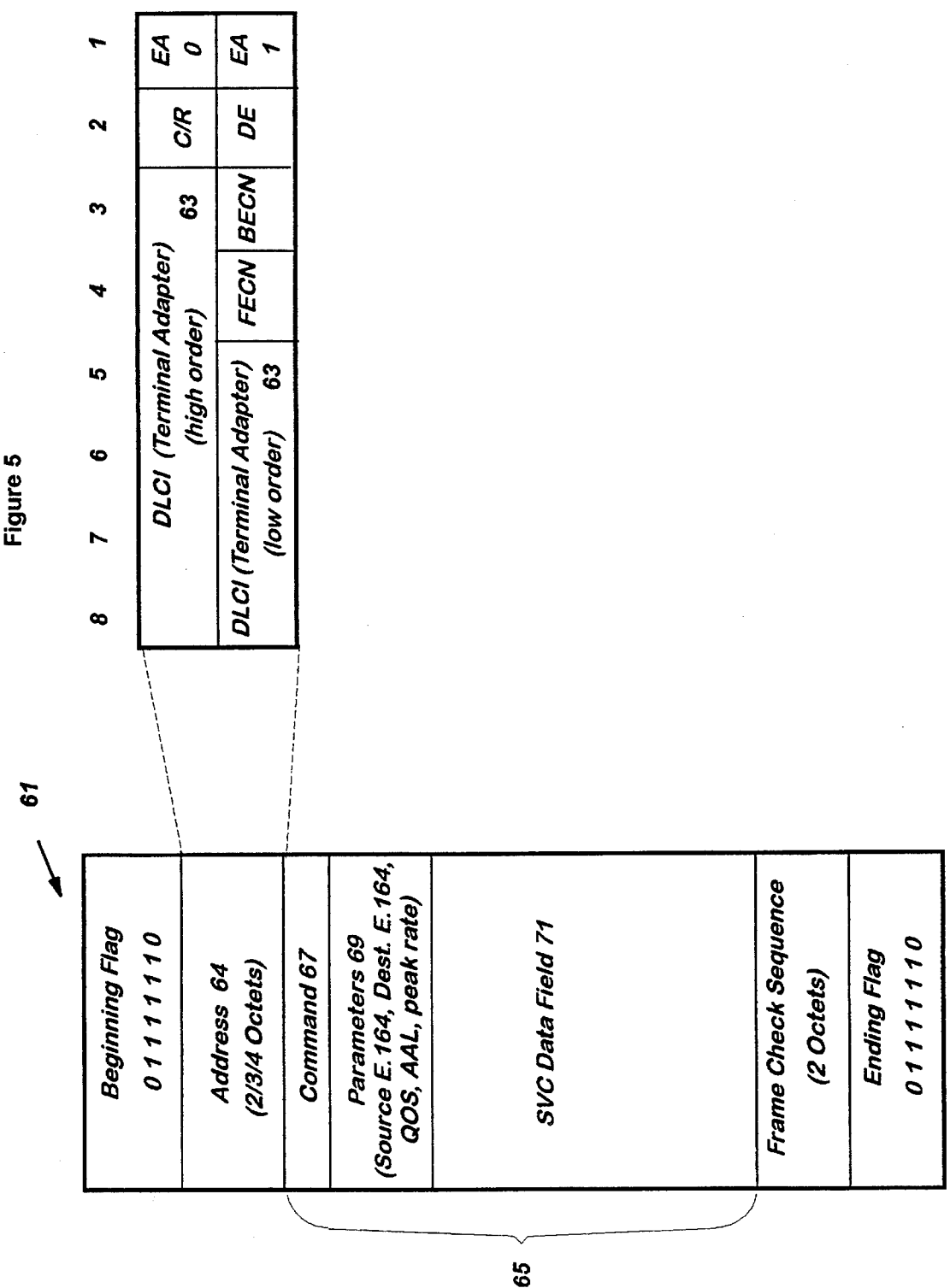
FIG. 5 illustrates a frame conforming to the enhanced Frame Relay formatting protocol of the present invention.

In order to establish an SVC call, the FR DTE 32 conveys a frame such as Frame 61 shown in FIG. 5. Frame 61 is a frame conforming to the Frame Relay formatting protocol as shown in FIG. 2 with the exception that it has the DLCI of the terminal adapter in the DLCI field 63. In addition, in the User Data Field 65, it has two more fields: a Command Field 67 and a Parameters Field 69. The contents of the Command Field 67 is information representing the following commands (as indicated above):

SVC Call Set-up

SVC Call Disconnect

SVC Call Accept

SVC Call Reject

SVC Data

In the Parameters Field 69, the FR DTE specifics the Source and Destination E.164 addresses (telephone numbers), the requested quality of service (QOS), the AAL type, and the peak rate. The remaining portion 71 of the field 65 is filled with data after the SVC call is established, i.e., when the SVC Data command is being issued.

In operation, when the FR DTE 32 wishes to establish a Q.2931 connection, it builds a FR frame in the Higher Layer element 56 having the DEC1 of the terminal adapter in the DLCI field 63, having the Call Set-up command in the Command field 67, and having the appropriate parameters in the Parameters field 69. The frame is conveyed to the terminal adapter and is received by the FR PHY Layer 40 which conveys it to the frame formatting element 42. Like in the above described PVC case, the frame formatting element 42 performs such functions as stripping off the beginning flag 62 and ending flag 70 and performing any error correction based upon the FCS 68. The T1.618 field 64 (address) and the user data field 65 are passed to the Servicing element 50.

Figure 6:
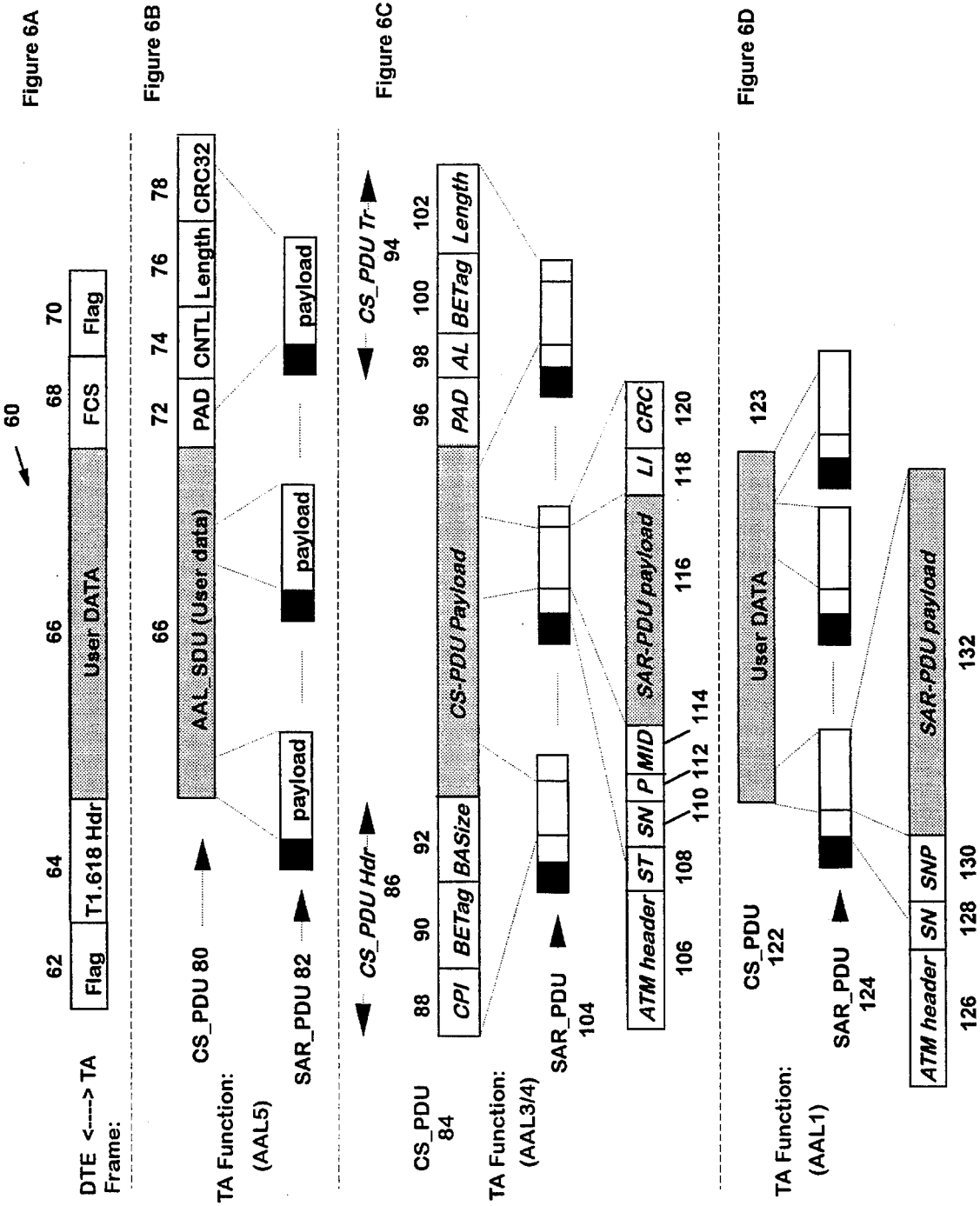

The Servicing element 50 first examines the address field 64 and, based upon the DLCI value, the Servicing element 50 knows that the User Data field has an SVC Command. In other words, the DLCI has an agreed upon value, for instance, the DLCI may be the terminal adapter's DLCI. The Servicing element 50 then examines the Command field 67. During the Call Set-up procedure, the Command field 67 will have the value of the Call Set-up command. The Servicing element then examines the Parameters field 69 to obtain the destination DTE's E.164 address. QOS. AAL type, etc. Based upon these values, the Servicing element 50 builds PDUs to be conveyed to the ATM AAL element 48 for ATM Adaptation layer processing. These PDUs represent the Q.2931 Call_Set-up commands for establishing an SVC call. The ATM AAL element 48 determines which AAL service is requested and, based upon that, builds the corresponding PDU. For instance, as shown in FIG. 6B, where AAL type 5 is chosen, the user data 66 is appended with a PAD field 72, a CNTL field 74, a 2 byte length field (Length 76), and a 4 byte CRC (CRC32 78). This forms the AAL5-CS_PDU 80 which is conveyed to the ATM Layer 46.

ATM Layer 46 segments these CS_PDUs 80 into AAL5-SAR_PDUs 82 (or ATM cells) also shown in FIG. 6B. The segmentation process is in accordance with the ATM protocols. The SAR_PDUs 82 are conveyed to the ATM PHY Layer 44 for transmission on the ATM network.

Where the AAL type ¾ is chosen, as shown in FIG. 6C, the AAL layer element 48 builds a plurality of CS_PDUs 84 comprising a CS_PDU Hdr 86 (having a CPI field 88, a BETag field 90, and a BASize field 92) and a CS_PDU Tr 94 (having a PAD field 96, an AL field 98, a BETag field 100, and a Length field 102). The CS_PDUs 84 are conveyed to the ATM Layer element 46. The ATM Layer element 46 segments the CS_PDUs 84 into ATM cells 104, each cell consisting of an ATM header field 106, an ST field 108, an SN field 110, a P field 112, a MID field 114, a SAR_PDU payload field 116, and LI field 118 and a CRC (Cyclic Redundancy Check) field 120.

Where AAL type 1 is chosen, as shown in FIG. 6D, the AAL Layer element 48 builds a plurality of CS_PDUs 122 comprising only the User Data 123. The CS_PDUs 122 are conveyed to the ATM Layer element 46. The ATM Layer element 46 segments the CS_PDUs 122 into ATM cells 124, each cell consisting of an ATM header field 126, an SN field 128, an SNP field 130, and a SAR_PDU payload field 132.

In the other direction, where the FR DTE 32 (32') is receiving data from another DTE, the procedure described above is performed in the opposite order. The ATM PHY Layer element 44 receives ATM cells and forwards them to the ATM Layer element 46. The ATM Layer element 46 reassembles them into CS_PDUs and forwards them to the ATM AAL Layer element 48. The ATM AAL Layer element 48 disassembles the CS_PDUs and forwards to the Servicing element 50 the User Data, the addresses, and other pertinent information such as the service used. The Servicing element 50 builds a T1.618 (or T1.618') Hdr and forwards the header and the data to the frame formatting element 42. The frame formatting element 42 builds the FR frame for transmission to the FR DTE.

For AAL1 cells received by the terminal adapter 34, a frame will be sent to the FR DTE 32' by the terminal adapter if the frame length reaches "L" bytes in a given amount of time, both of which are predefined by the FR DTE 32' and terminal adapter. If the frame length does not reach "L" bytes in that time, the frame will conveyed to the FR DTE in any case m order to limit delay. A timer is used to determine the given amount of time for each AAL1 frame.

Figure 7:
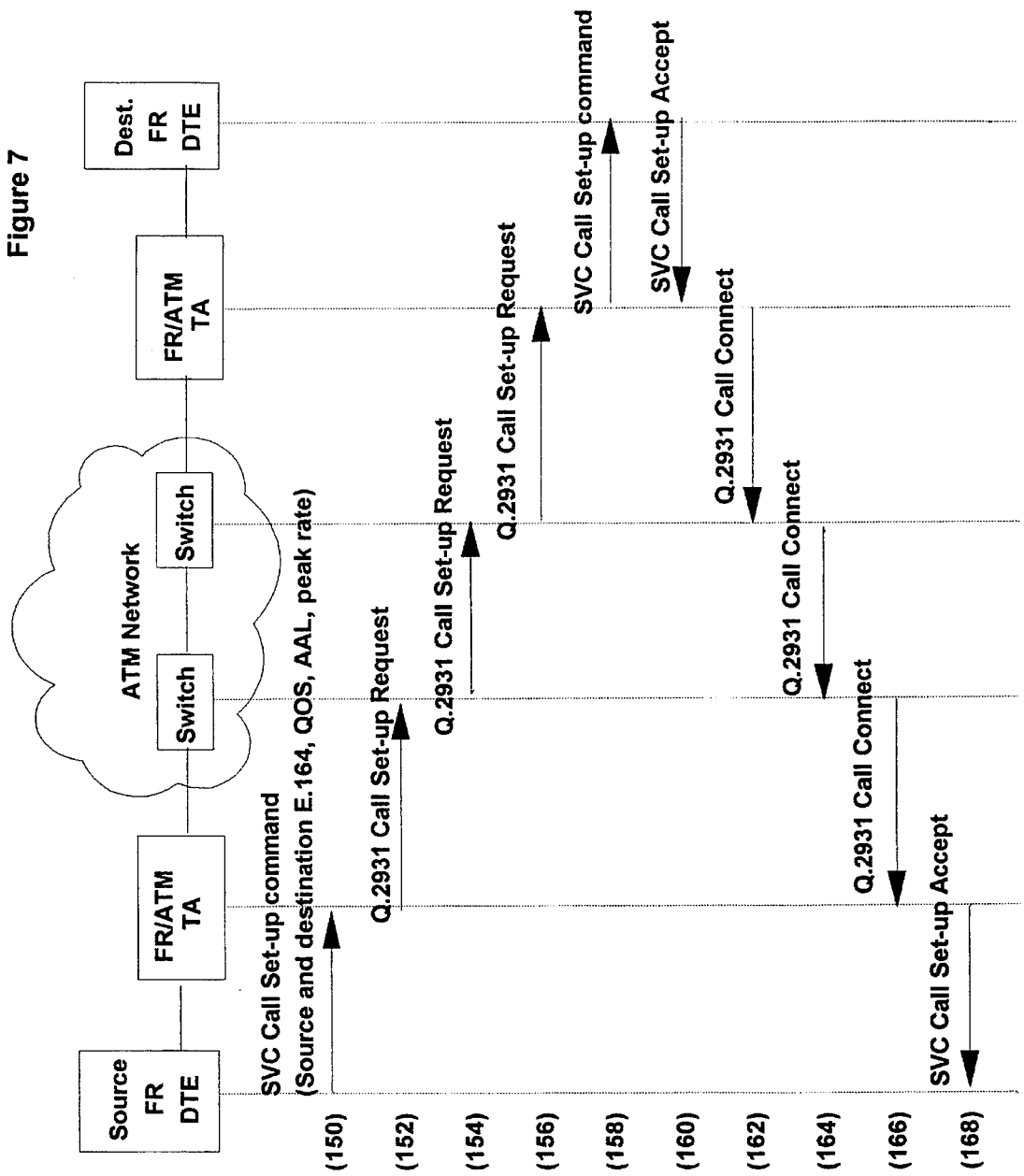
FIG. 7 illustrates a message flow diagram illustrating the messages exchanged during a Call_Set-up procedure when a FR DTE wishes to establish a connection with an ATM DTE or with another FR DTE connected to the ATM network utilizing the terminal adapter of the present invention.

FIG. 7 illustrates a message flow diagram illustrating the messages exchanged during a Call_Set-up procedure when a FR DTE wishes to establish a connection with an ATM DTE or with another FR DTE connected to the ATM network utilizing the terminal adapter of the present invention. At step 150, the Source FR DTE issues a Call Set-up command to its terminal adapter. As was discussed, this is merely a normal FR frame having a unique DLCI which the terminal adapter will recognize, such as the terminal adapter's DLCI. In that case, where the terminal adapter finds its own DLCI in the DLCI field, it examines the payload. Based upon the command (in this case, the Call Set-up command), the terminal adapter build the corresponding ATM cells to be conveyed to the ATM network for establishing the call.

At 152, the terminal adapter initiates the Call_Set-up request with the ATM network (using one or more ATM switches) by issuing a Q.2931 Call_Set-up request (which is understood by the ATM network) to the network. The ATM network establishes a path from the source FR DTE to the destination FR DTE and it also allocates the bandwidth required for the call. Once the path is determined between the source and the destination FR DTE, the request is sent to the destination FR DTE through the specified path. This figure shows the request is sent from the source ATM switch to the destination ATM switch at 154, then to the destination terminal adapter at 156. The destination terminal adapter converts this Q.2931 Call_Set-up request into a Call_Set-up command and envelopes it in a frame relay frame and forwards it to the Destination FR DTE at 158. The Destination FR DTE can either accept or reject the Call_Set-up request. In this example, the request is accepted and the Destination FR DTE issues a Call Accept to the terminal adapter at 160. The Call Accept is the same as the Call Set-up command discussed above, i.e., it is a frame relay frame having the DLCI of the terminal adapter and parameters indicating that it is a Call Accept. At 162, the terminal adapter issues a Q.2931 Call_Connect to the ATM network which is forwarded to the originating terminal adapter at 164 and 166. The terminal adapter converts the Q.2931 Call Connect to a frame relay frame and forwards this to the Source FR DTE.

Figure 8:
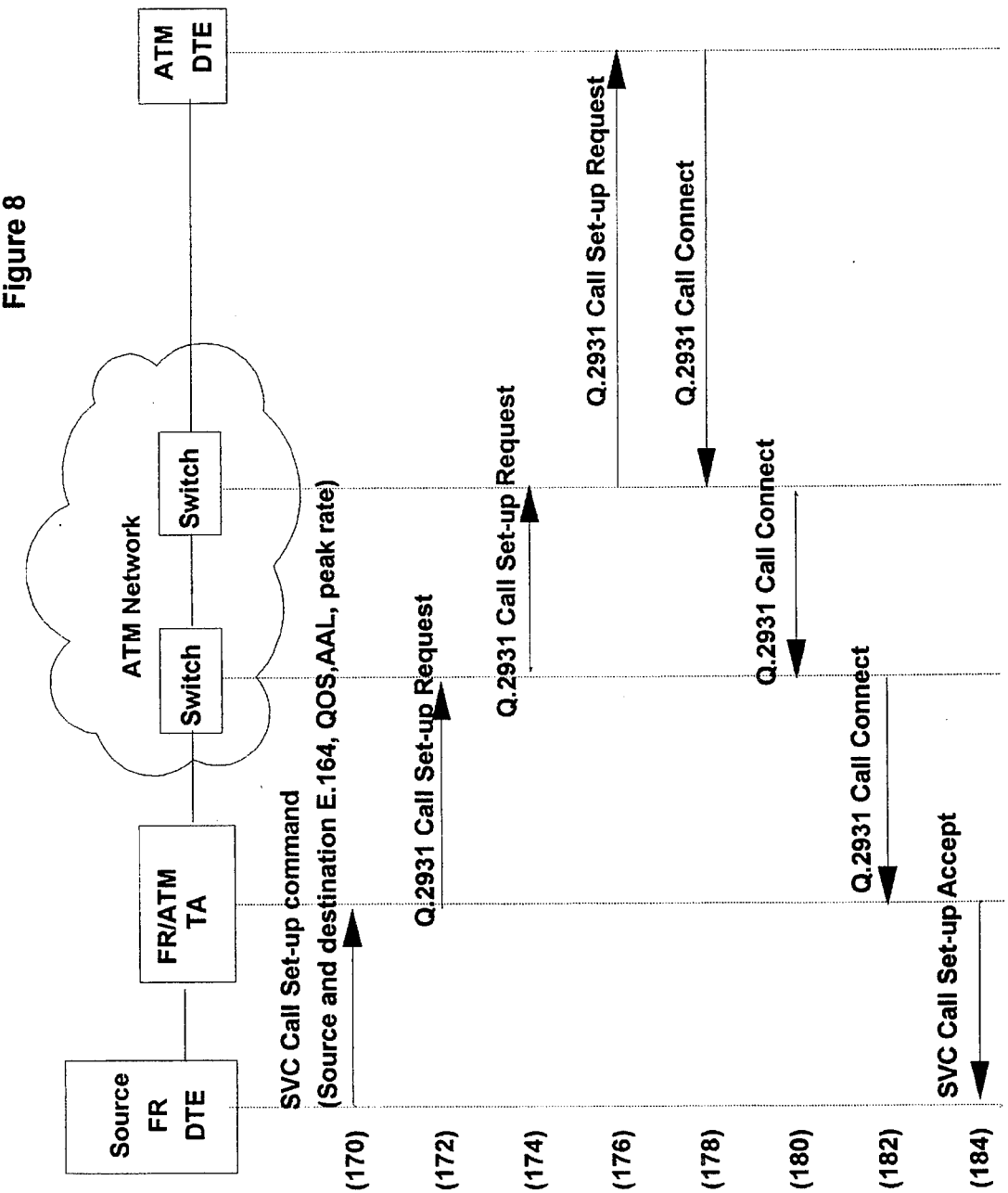
FIG. 8 illustrates a slight variation of this Call_Set-up procedure of that shown in FIG. 6 where, in this case, the connection is with an ATM DTE.

A slight variation of this Call_Set-up procedure (where the connection is with an ATM DTE) is shown in FIG. 8. At 170, the Source FR DTE issues the Call Set-up Command to the terminal adapter. At 172, the terminal adapter issues the Q.2931 Call Set-up request to the ATM network. At 174 and 176, the request is forwarded to the ATM DTE. At 178, the ATM DTE responds with a Q.2931 Call Connect which is forwarded back to the terminal adapter at 180 and 182. At 184, the Call Accept is forwarded back to the Source FR DTE.

Figure 9:
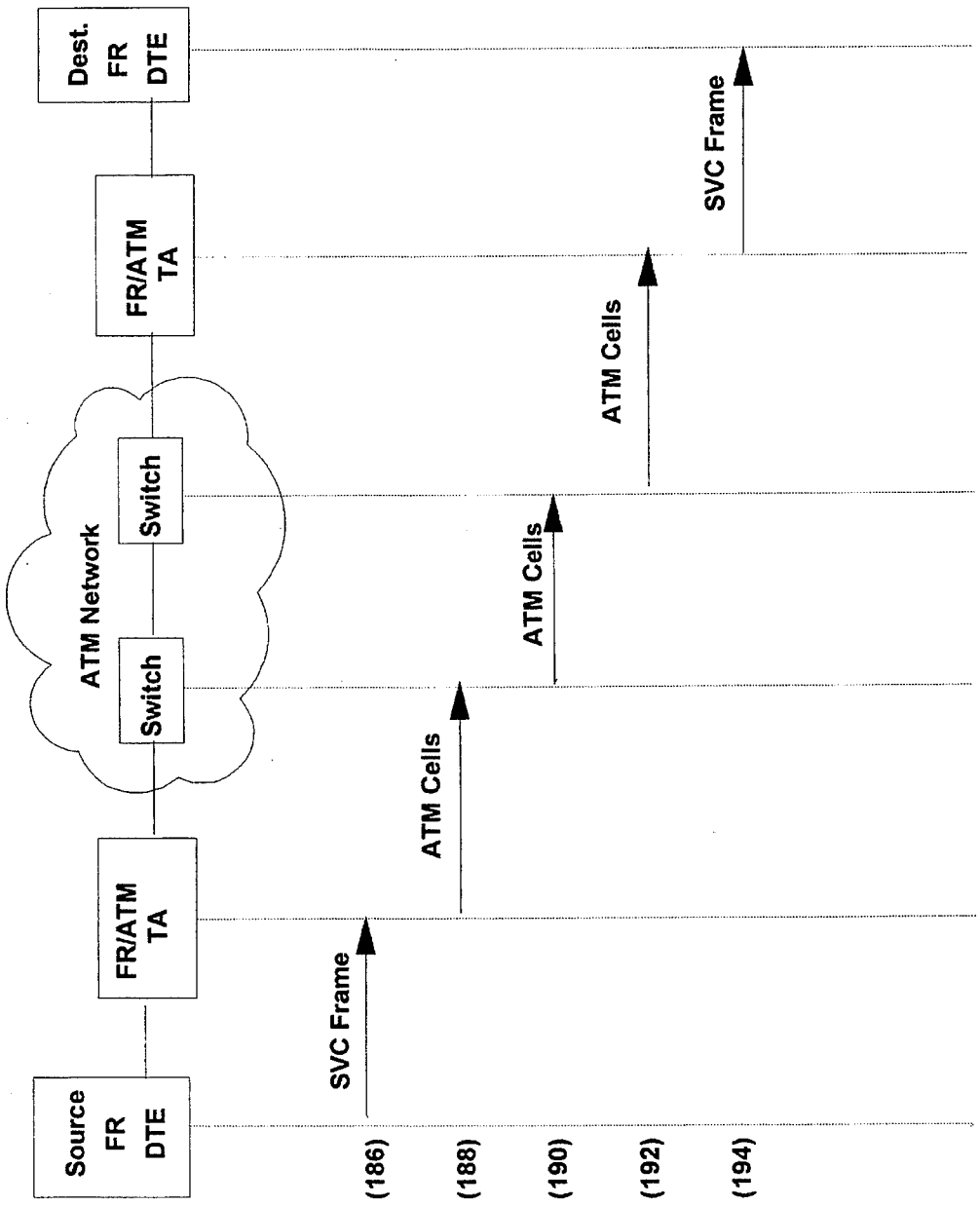
FIG. 9 illustrates the data transfer from the Source FR DTE to the Destination FR DTE.

FIG. 9 illustrates the data transfer from the Source FR DTE to the Destination FR DTE. (Likewise, the destination could be the ATM DTE shown in FIG. 8.) At 186, frame relay frames are conveyed to the terminal adapter. As discussed above,e the DLCI, again, will be that of the terminal adapter so that the terminal adapter will examine the payload of the frame. Because this is an SVC data frame, the Command field 67 will compromise the SVC Data command. At 188, the SVC data frame is converted to ATM cells as discussed above. The ATM cells are forwarded to the Destination FR DTE at steps 190 and 192 and, at 194, where they are reassembled and converted back to a frame relay frame and conveyed to the Destination FR DTE.

Figure 10:
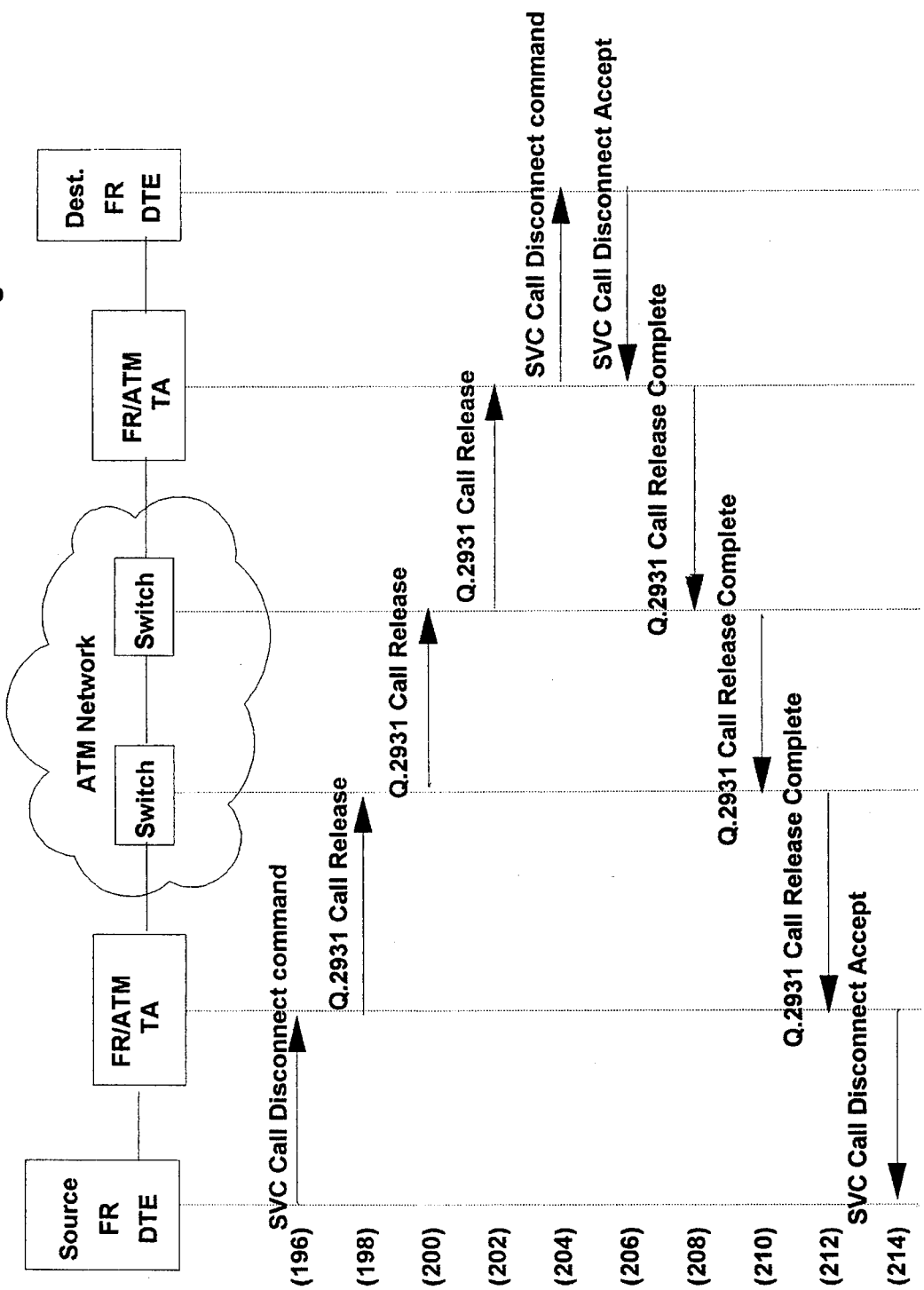
FIG. 10 illustrates the Call Release procedure so that the SVC connection may be released by the communicating DTEs.

FIG. 10 illustrates the Call Release procedure so that the SVC connection may be released by the communicating DTEs. At 196, the FR DTE initiates the SVC Call Disconnect procedure by conveying the SVC Call Disconnect command to the terminal adapter. At 198, the terminal adapter initiates the Call Disconnect procedure with the ATM network (using one or more ATM switches) by issuing a Q.2931 Call_Release request to the network. At 200, the Q.2931 request is forwarded through the ATM network and, at 202, reaches the terminal adapter corresponding and connected to the destination FR DTE. The terminal adapter converts this Q.2931 Call Release request into an SVC Call Disconnect command and envelopes it in a frame relay frame and forwards it to the Destination FR DTE at 204. The Destination FR DTE can either accept or reject the SVC Call Disconnect request. In this example, the request is accepted and the Destination FR DTE issues an SVC Call Disconnect Accept to the terminal adapter at 206. At 208, the terminal adapter issues a Q.2931 Call_Release_Complete to the ATM network which is forwarded to the originating terminal adapter at 210 and 212. The terminal adapter converts the Q.2931 Call_Release_Complete to a frame relay frame and forwards this to the Source FR DTE at 214.

Thus, it can be seen that the method and system of the present invention provide a mechanism for adapting a native Frame Relay DTE For using the SVC connection mechanism of an ATM network—either for communicating with an ATM DTE or another Frame Relay DTE using a terminal adapter of the present invention. While the invention has been particularly shown and described with reference to preferred embodiments thereof, it will be understood by those skilled in the art that various other changes in form and detail may be made without departing from the spirit and scope of the invention.

What is claimed is:

1. For use with a frame relay terminating equipment (FR DTE) and an asynchronous transfer mode (ATM) network providing a Switched Virtual Circuit (SVC) service and having one or more communications units connected thereto, a terminal adapter for providing an interface to said ATM network for said FR DTE so that said FR DTE is able to communicate with at least one of said one or more communications units over said ATM network using said SVC service, said terminal adapter comprising:

a servicing element;

a FR DTE interface connected to said servicing element, said FR DTE interface comprising means for receiving frame relay (FR) frames from said FR DTE, said FR frames having a Data Link Connection Identifier (DLCI) field and a data field, at least one of said FR frames being an SVC frame and having a DLCI uniquely known by said terminal adapter, means for building information packets from said received FR frames, means for conveying said information packets to said servicing element; and an ATM network interface connected to said servicing element, said ATM network interface comprising means for receiving protocol data units (PDUs) from said servicing element, means for building ATM cells by segmenting said PDUs, and means for conveying said ATM cells to said ATM network, said servicing element comprising means for receiving information packets from said FR DTE interface, means for examining the contents of said DLCI field and of said data field, means for building PDUs based upon the contents of said DLCI field and said data field, said PDU building means comprising means for recognizing said uniquely known DLCI of said SVC frame and for building a PDU representing an SVC command based upon the contents of said data field of said SVC frame, and means for conveying PDUs to said ATM network interface.

2. The terminal adapter defined in claim 1 wherein said FR DTE interface further comprises means for conveying FR frames to said FR DTE, means for building an information packet from each received FR frame, means for receiving information packets from said servicing element, and means for building FR frames to be conveyed to said FR DTE.

3. The terminal adapter defined in claim 1 wherein said ATM network interface further comprises means for receiving ATM cells from said ATM network, means for building protocol data units (PDUs) by reassembling ATM cells received from said ATM network, and means for conveying PDUs to said servicing element.

4. The terminal adapter defined in claim 1 wherein said servicing element further comprises means for conveying information packets to said FR DTE interface, means for receiving PDUs from said ATM network interface, and means for building information packets based upon the contents of said PDUs.

5. The terminal adapter defined in claim 1 wherein said data field of said SVC comprises an SVC call connect command and said PDU building means comprises means for building a PDU representing a Q.2931 Call Connect request.

6. The terminal adapter defined in claim 5 wherein said data field of said SVC frame further comprises SVC data and said PDU building means comprises means for building a PDU representing Q.2931 data.

7. The terminal adapter defined in claim 5 wherein said data field of said SVC frame comprises an SVC call disconnect command and said PDU building means comprises means for building a PDU representing a Q.2931 Call Disconnect request.

8. The terminal adapter defined in claim 5 wherein said data field of said SVC frame further comprises a parameters field having information representing an E.164 address of said at least one communications units and a quality of service (QOS) requested and said PDU building means for building a PDU representing said E.164 address and said requested QOS.

9. The terminal adapter defined in claim 8 wherein said parameters field further has information representing an ATM Adaptation Layer (AAL) type service and peak rate requested and said PDU building means comprises means for building a PDU representing said requested AAL type service and peak rate.

10. For use in a terminal adapter connected between a frame relay data terminating equipment (FR DTE) and an asynchronous transfer mode (ATM) network providing a Switched Virtual Circuit (SVC) service and having one or more communications units connected thereto, said terminal adapter providing an interface to said ATM network for said FR DTE so that said FR DTE is able to communicate with at least one of said one or more communications units via said SVC service, said terminal adapter comprising a servicing element, a FR DTE interface connected to said servicing element and an ATM network interface connected to said servicing element, said method comprising the steps of:

in said FR DTE interface, receiving frame relay (FR) frames from said FR DTE, said FR frames comprising a DLCI field and a data field, at least one of said FR frames being an SVC frame and having a DLCI value uniquely known by said terminal adapter, building information packets from said FR frames, and conveying said information packets to said servicing element;

in said ATM network interface, receiving protocol data units (PDUs) from said servicing element, and building ATM cells to be conveyed to said ATM network by segmenting said PDUs; and in said servicing element:

receiving information packets from said FR DTE interface;

examining said DLCI of each received packet and determining if the value of said DLCI is recognized as being unique;

if the DLCI value is unique, examining the contents of said data field;

building PDUs based upon the contents of said data field; and conveying PDUs to said ATM network interface.

11. The method defined in claim 10 wherein said data field of said SVC frame comprises an SVC call connect command and said building PDUs step comprises the step of building PDUs representing a Q.2931 Call Connect request.

12. The method defined in claim 10 wherein said data field of said SVC frame further comprises SVC data and said building PDUs step comprises the step of building PDUs representing data frames to be conveyed over said ATM network.

13. The method defined in claim 10 wherein said data field of said SVC frame comprises an SVC call disconnect command and said building PDUs step comprises the step of building PDUs representing a Q.2931 Call Connect request.

14. The method defined in claim 10 further comprising the steps of, in said FR DTE interface, conveying FR frames to said FR DTE, building an information packet from each received FR frame, receiving information packets from said servicing element, and building FR frames to be conveyed to said FR DTE.

15. The method defined in claim 10 further comprising the steps of, in said ATM network interface, receiving ATM cells from said ATM network, building PDUs by reassembling ATM cells received from said ATM network, and conveying PDUs to said servicing element.

16. The method defined in claim 10 further comprising the steps of, in said servicing element, conveying information packets to said FR DTE interface, receiving PDUs from said ATM network interface, and building information packets based upon the contents of said PDUs.

17. The method defined in claim 10 wherein said data field of said SVC frame further comprises a parameters field having information representing the address of said at least one communications units and a quality of service (QOS) requested and said data field examining step further comprises the step of examining parameters field.

18. The method defined in claim 17 wherein said parameters field of said SVC frame further has information representing an ATM Adaptation Layer (AAL) type service and peak rate requested and said building PDUs step comprises the step of build PDUs representing said requested AAL type service and said requested peak rate.

19. For use with an asynchronous transfer mode (ATM) network providing a Switched Virtual Circuit (SVC) service and having one or more communications units connected thereto, a system for communicating with said one or more communications units over said ATM network using said SVC service comprising:

means for generating and conveying frame relay (FR) frames, said FR frames comprising a DLCI field and a data field, at least one of said FR frames being an SVC frame and having a DLCI uniquely known by said terminal adapter;

a servicing element;

an FR interface connected between said FR frame generating and conveying means and said servicing element, said FR inteface comprising means for receiving said FR frames from said FR frame conveying means, means for building an information packet from each FR frame received from said FR frame conveying means, and means for conveying said information packets to said servicing element; and an ATM network interface connected to said servicing element, said ATM network interface comprising means for conveying ATM cells to said ATM network, means for receiving protocol data units (PDUs) from said servicing element, and means for building ATM cells to be conveyed to said ATM network by segmenting said PDUs, said servicing element comprising means for receiving information packets from said FR interface, means for examining the contents of said DLCI field and of said data field, means for building PDUs based upon the contents of said DLCI field and said data field, said PDU building means comprising means for recognizing said uniquely known DLCI of said SVC frame and for building a PDU representing an SVC command based upon the contents of said data field of said SVC frame, and means for conveying PDUs to said ATM network interface.

20. The system defined in claim 19 wherein said data field of said SVC frame comprises an SVC call connect command and said PDU building means comprises means for building a PDU representing a Q.2931 Call Connect request.

21. The system defined in claim 19 wherein said data field of said SVC frame further comprises SVC data and said PDU building means comprises means for building a PDU representing Q.2931 data.

22. The system defined in claim 19 wherein said data field of said SVC frame comprises an SVC call disconnect command and said PDU building means comprises means for building a PDU representing a Q.2931 Call Disconnect request.

23. The system defined in claim 19 wherein said FR interface further comprises means for conveying FR frames to said FR frame conveying means, means for building an information packet from each received FR frame, means for receiving information packets from said servicing element, and means for building FR frames to be conveyed to said FR frame conveying means.

24. The system defined in claim 19 wherein said ATM network interface further comprises means for receiving ATM cells from said ATM network, means for building PDUs by reassembling ATM cells received from said ATM network, and means for conveying PDUs to said servicing element.

25. The system defined in claim 19 wherein said servicing element further comprises means for conveying information packets to said FR interface, means for receiving PDUs from said ATM network interface, and means for building information packets based upon the contents of said PDUs.

26. The system defined in claim 19 wherein said data field of said SVC frame further comprises a parameters field having information representing an E.164 address of said at least one communications units and a quality of service (QOS) requested and said PDU building means comprises means for building a PDU representing said E.164 address and said requested QOS.

27. The system defined in claim 26 wherein said parameters field of said SVC frame further has information representing an ATM Adaptation Layer (AAL) type service and peak rate requested and said PDU building means comprises means for building a PDU representing said requested AAL type service and peak rate.

28. A frame relay terminating equipment (FR DTE) for communicating over an asynchronous transfer mode (ATM) network providing a Switched Virtual Circuit (SVC) service, said ATM network having one or more communications units connected thereto, said FR DTE for being connected to a terminal adapter providing an interface to said ATM network for said FR DTE by receiving frame relay (FR) frames from said FR DTE, processing said FR frames and conveying said processed frames to said ATM network, said FR DTE comprising:

means for building said FR frames and conveying said FR frames to said terminal adapter, said FR frames having a Data Link Connection Identifier (DLCI) field and a data field, at least one of said FR frames being an SVC frame having a DLCI uniquely known by said FR DTE and said terminal adapter and further having a data field with a value representing an SVC command; and means for receiving FR frames from said terminal adapter, said receiving means comprising means for identifying an FR frame having said DLCI uniquely known by said FR DTE and said terminal adapter as being an SVC frame, said receiving means further having means for examining said data field for retrieving said SVC command.

\* \* \* \* \*